United States Patent Office 2,708,921
Patented May 24, 1955

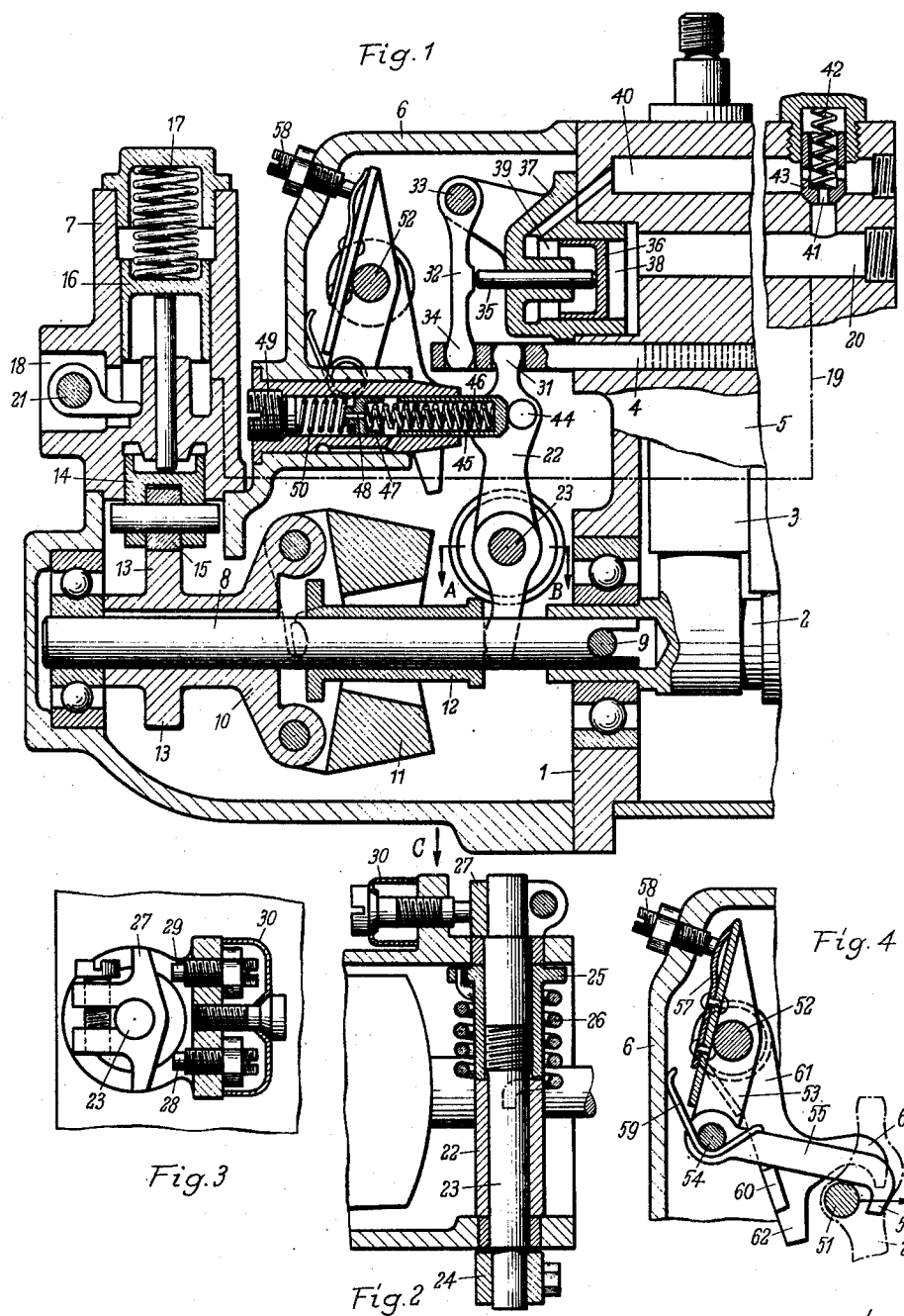

2,708,921

CONTROL DEVICE FOR COMBUSTION ENGINES

Heinrich Karl Links, Stuttgart, Germany, assignor to Daimler-Benz Aktiengesellschaft, Stuttgart-Unterturkheim, Germany Application March 21, 1951, Serial No. 216,762

Claims priority, application Germany March 21, 1950

19 Claims. (Cl. 123—140)

The invention relates to a control device for combustion engines, especially for injection engines. An object of the invention is to provide a control mechanism for controlling an upper as well as a lower speed range, which mechanism has a sufficiently high energy capacity for its relatively small weight.

Another object of the invention is to provide separate governors for a lower and an upper speed range. For such control devices, and for the upper speed range thereof, a simple, relatively small centrifugal governor can be used which has a sufficiently high energy capacity at high speeds in order to maintain a fixed, and in some cases a controllable upper limit speed with a relatively small degree of irregularity. For simultaneous control in the lower speed range, for example, for maintaining as low an idling speed as possible, such a relatively small centrifugal governor would not suffice, however, because of its low energy capacity.

With the foregoing in view, an important feature of the present invention lies in the use of a hydraulic governor as governor for the lower speed range which range is especially the idling speed range. According to a further feature of the invention, the back pressure in the fuel feeding pipe to the injection pump serves preferentially as control pressure. The control piston of the hydraulic governor is for this purpose suitably exposed to the pressure in the fuel feeding space, on the one hand, and, on the other, to the pressure in the fuel return space of the fuel pump, whereby between feeding and return of the injection pump a throttle place and a safety valve are preferably provided. In comparison with the use of a pneumatic governor for the lower speed range the hydraulic governor according to my invention has the following advantages: An especially low degree of irregularity, as required in motor service, is obtained. Vibration and oscillations of the governor which frequently occur especially at idling speeds, are avoided, if according to a further feature of the invention such a governor is in a simple way combined with a mechanism for damping such oscillations. Furthermore, the reduction of power by the hydraulic governor is avoided which reduction is effected in consequence of the necessary throttle plate in the suction socket. The hydraulic governor can be combined with the injection pump or with the feeding pump into a co-ordinated unit, especially when the fuel itself is used for controlling purposes. In that case, pipe lines leading to the outside, which may be the cause of leaks, are unnecessary.

According to a further feature of the invention, both governors are in some cases located together with the feeding pump in a common housing at the end of the injection pump. The governor for the upper speed range, particularly a centrifugal governor is suitably arranged on an insertion shaft which is inserted into and coupled with the camshaft of the injection pump and axially attached to it. At the same time, this insertion shaft may also be a camshaft for the fuel feeding pump which conveys the fuel to the injection pump whereby, for example, the centrifugal weight carrier of the governor at the same time carries the cams of the feeding pump and the pump case of the feeding pump is attached to the governor case.

A further object of the invention concerns the special construction and adjustability of the stops for the quantity control member which limit the control range. A feature of the invention consists further in a device which forcibly entrains the quantity control member above the idling limit position, or the full load position to a stop or start position. This occurs when, for instance, the quantity control member or the intermediate rods operating the same are adidtionally adjusted against the effect of the idling spring or if the full load stop is moved out of the range of the quantity control member or its rods.

According to a further feature of the invention the full load stop is elastically formed or arranged. In that case, for example, the possibility exists that by changing the control pressure, the full load quantity in the medium and lower speed range is increased within certain suitable limits and therewith an assimilation of the injection quantity to the torque course of the motor is obtained.

According to a further feature of the invention, the stop limiting the position of the quantity control member is suitably arranged on a pawl-like lever arm which is situated on a suitably elastically supported lever arm arranged rectangularly therewith. For effecting a full load stop, the pawl-like arm can thereby be rotated around its center of motion against a spring effect.

According to a further feature of the invention, there is provided another lever arm supported alongside the lever arm which carries the pawl-like arm. It carries stops by which, on the one hand, the full load stop is effected, and, on the other hand, the quantity control member can be adjusted in some case compulsorily into start position or stop position.

Further objects and features of the invention will become apparent from the following detailed description taken in conjunction with the accompanying drawings, wherein:

Fig. 1 shows a longitudinal section through the control aggregate flanged at a fuel injection pump;

Fig. 2 shows a horizontal section taken on line A—B of Figure 1;

Fig. 3 shows a view in direction C of the figure 2 of the stop mechanism for the governor lever shaft; and Fig. 4 shows a view of the device with the full load stop and for adjusting the quantity control member in stop and start position.

The camshaft 2 for the pump ram 3 is situated in housing or case 1 of the injection pump, and is driven by the combustion engine of the vehicle. For controlling the fuel quantity, a rack 4 serves in the known manner which may turn the individual pump cylinders (not shown) with the axis 5 or the pistons thereof, driven by rams 3.

To one frontal side of the case 1 of the injection pump is flanged the governor case 6 with the feeding pump case 7. The governor shaft 8 is formed as an insertion shaft and is inserted into a bore of the camshaft 2 with which, for example, it is coupled by a pin 9. Firmly arranged on the shaft 8 is a centrifugal power governor with centrifugal weights 11 and the governor sleeve 12 movable by the weights 11. The centrifugal weight carrier 10 simultaneously carries two cams 13 on which rides a roller 15 mounted in ram 14 for feeding pump piston 16, whereby the pistons and rams are pressed downwardly by spring 17. The fuel is sucked in from the fuel tank, at 18 and is forced through the schematically indicated pipe line 19 in which, for example, a filter is arranged, into the feeding space 20 of the injection pump. A handpump member 21 can be used for operating the feeding pump also by hand.

A two-armed lever 22 serves for transmitting the control movement of the centrifugal weight 11, or of the governor sleeve 12. The lever 22 is freely rotatably supported on a shaft 23 in the case 6. The shaft 23 can be rotated from outside by a lever 24, which in turn may be operated by a gas pedal from the driver's seat section of the vehicle. A sleeve 25 is securely mounted on shaft 23, as, for example, by means of a wedge or a spline and groove arrangement. The sleeve 25 is connected to lever 22 by a helical spring 26 which is operative upon turning in such a way that upon rotating the lever 24 a spring force in the same direction of rotation is exerted on lever 22. A campiece 27 is mounted on the free end of the shaft 23 by means of a wedge or a spline and groove arrangement, which cooperates with the adjustable stops 28 and 29, whereby the latter are arranged under a screwed-on hood 30 (Figs. 2 and 3).

The upper end 31 of the lever 22 engages a groove in the control rack 4 so that the control rack 4 is moved in one or the other direction, when the lever moves. Furthermore, a lever 32 engages the control rack 4. The lever 32 is pivotally supported at its upper end 33, and at its lower end 34 it engages a second groove of the rack 4. A control piston 36 is supported against lever 32 by means of a ram 35 which slides in a cylinder 37. The right piston side 38 of the cylinder is in open communication with the feeding space 20 of the injection pump, while the left piston side 39 is in communication with the return space 40 of the pump. In the construction illustrated herein the return space 40 is shown for clarity's sake above the feeding space 20, while in practice it is usually arranged on the side of the pump cylinder opposite of the feeding space 20. Both spaces are in communication with each other by a throttle opening 41, arranged in a shifting safety valve 43, which is actuable by means of spring 42. The fuel can return to the fuel tank or into the suction pipe line from the return space 40.

A pin 44 is provided on the lever 22 against which a piston 45 abuts under the effect of a spring 46. The spring 46 rests against a movable counter support 47 provided with a throttle bore 48. Another spring 50 is provided between the support 47 and an adjustable spring support 49. The space within the piston 45 with the spring 46 is filled with fuel which can flow off through the throttle bore 48 over the space of the spring 50.

A stop 51 is further provided on the lever 22 which cooperates with the pawl mechanism shown in Fig. 4. This mechanism consists of double armed lever 53 pivotally supported in casing 6 by a shaft 52 with which a pawl 55 provided with a hookshaped stop 56 is pivotally connected by means of a pin 54. A leaf spring or a spring-plate 57 is riveted to the lever 53 which presses against an adjustable stop screw 58 in the case 6. The pawl 55 is constantly pressed downwardly by a screw bending spring 59 against a stop 60 of another lever arm 61, which is also pivotally supported on shaft 52 coaxially with lever 53. The lower end of lever arm 61 terminates in the stops 62 and 63, arranged in the shape of a fork. The lever 61 together with the shaft 52, can, for example, be adjusted from the outside, in order to bring the control cam to the stop or start position.

The manner in which the control device, as shown, is operated is as follows: In the lower speed range or during idling speed the spring 26 is adjusted to the least initial tension by means of lever 24. As a consequence of the low idling speeds and the low energy capacity of the centrifugal governor the latter is ineffective so that only the hydraulic governor with the control piston 36 becomes effective. The difference in pressure, produced by the throttle bore 41 between the spaces 20 and 40, or 38 and 39 effects the idling control of the control rack 4 by piston 36. If the speed rises above the predetermined idling speed, the piston 36 and therewith control rack 4 is moved to the left against the effect of the idling springs 46 and 50. During rapid control oscillations, as they frequently occur during idling, the fluid cannot be displaced quickly enough from the space of the spring 46 through throttle bore 48. Piston 45, spring 46, and spring support 47 will therefore move as a unit, so that only the relatively hard spring 50 becomes effective. With a slow control movement, however, the fluid can flow through the throttle bore 48 so that a soft yielding also of spring 46 is possible. By such slow control movement, it will be noted that the rack 4 is adjusted for a lower fuel quantity and the speed is reduced until the desired idling speed is reached again. With speed below the idling speed the piston 36 is adjusted to the right under the effect of the springs 46 and 50 and thereby the speed increases again.

In the upper speed range, the hydraulic governor is practically inoperative in that the safety valve 43 opens at a predetermined pressure and thereby the difference in pressure is essentially equalized between the piston sides 38 and 39. If the lever shaft 25 is rotated clockwise, then the tension of the spring 26 is increased, and more particularly in the sense that the spring effect tries to adjust the control rack 4 to the full load position thereof. The more the spring 26 is tensioned the higher must the speed become, at which the governor weights 11 diverge, whereby the idling springs 46 and 50 act in addition to the control spring 26. If, for example, the highest adjusted full load speed is exceeded, so that the governor weights 11 diverge, then the lever 22 is rotated counterclockwise and the rack 4 is shifted in the direction of zero or no feeding or in the direction of feeding of smaller injection quantities. If the speed hereupon is reduced again, there occurs a reverse movement of the governor rack in direction of full load, until the equilibrium position is again obtained.

When the lever 22 is rotated in the full load direction, the stop 51 at lever 22 comes into contact with the hook-shaped stop 56 on the pawl 55. The pawl can thereby yield a little in direction of the turning movement of the lever 22, i. e., in direction of the arrow x, Fig. 4, by taking with it the lever arm 53 and turning it around its pin 52. The plate spring 57 thereby effects a light springiness of the lever which is of advantage especially for low or medium speeds, as the pump can exceed a little the normally adjusted full load feeding in a suitable way for assimilating the quantity.

Should the pump be turned off, then the fork-like lever arm 61 is rotated clockwise. Thereby the pin 51 is forced to the left by the stop 63 against the effect of the governor spring 26, or of the idling springs 46, 50, and the control rack 4 is adjusted to a position of zero or no feeding. If the pump is to be brought into starting position, then the fork-like lever arm 61 is rotated counter-clockwise, the consequence of which is that the pawl 55 with the stop 56 comes into contact with and is riveted by stop 60 and is thereby removed from the area of the stop pin 51 of lever 22. At the same time the stop pin 51 is forcibly moved along to the right by the stop 62. The rack 4 is thereby adjusted to a position corresponding to an overload quantity of fuel for starting purposes.

The position of the elastic full load stop 56 can be adjusted by the set screw 58, the idling elasticity by the set screw 49. The stops 28 and 29 serve to fix the position of the lever 24, or the final tension of the control spring 26.

The invention is not limited to the shown example but can be varied ad libitum within the scope of the single ideas of the invention.

What I claim is:

1. Control mechanism for an internal combustion engine, comprising a first control device for an upper speed range of the engine, a separate second control device for a lower speed range of the combustion engine, a supply line system for the fuel of the internal combustion engine, means for actuating said second control device by the pressure of said fuel, said pressure being dependent on the rotational speed of the engine, a member for controlling the quantity of fuel fed to the engine, and means connecting said controlling devices to said controlling member for adjusting said controlling member upon adjustment of said controlling devices.

2. Control mechanism for an internal combustion engine, comprising a centrifugal governor for an upper speed range of the engine, a separate control device for a lower speed range of the combustion engine, a supply line system for the fuel of the internal combustion engine, means for actuating said control device by the pressure of the fuel in said system, said pressure being dependent on the rotational speed of the engine, a member for controlling the quantity of fuel fed to the engine, and means connecting said centrifugal governor and said control device to said controlling member for adjusting said controlling member upon adjustment of said centrifugal governor and said control device.

3. Control mechanism for an internal combustion engine comprising a mechanical control device for an upper speed range of the engine, a fuel-feed line system for said combustion engine, a separate hydraulic control device for a lower speed range of the combustion engine operatively connected in said line system for operation by the pressure of the fuel in said fuel-feed line system, means for controlling the quantity of fuel fed to the engine, and means for controlling said last-mentioned means in dependence upon adjustment of said control devices.

4. Control mechanism for a combustion engine and a fuel injection pump with a feeding line and a return line therein, comprising a mechanical speed governor for the upper speed range and a hydraulic governor for a lower speed range, said hydraulic governor comprising a piston whose one side is in communication with said feeding line and whose other side is in communication with said return line, a member for controlling the fuel quantity, and means by which the control devices adjust said control member.

5. Control mechanism according to claim 4, having a throttle between said feeding and said return line, and a safety valve between said feeding and said return line which opens at a certain medium difference in pressure between said feeding and said return line.

6. Control mechanism for a combustion engine with an injection pump, a fuel feeding pump and a control mechanism, comprising a mechanical speed governor for an upper speed range, a hydraulic governor for a lower speed range, said injection pump, said feeding pump and said control mechanism each being provided with a housing, a supply line system containing a liquid therein, means for operating said hydraulic speed governor by the pressure of said liquid, said pressure being dependent on the rotational speed of the engine, an injection pump shaft, a governor shaft, and means for fastening together said injection pump housing and said control mechanism housing to each other with said two shafts in coaxial relationship and with one shaft inserted into the other, said housings forming a common housing aggregate.

7. Control mechanism for a combustion engine with an injection pump, a fuel pump and a control mechanism, comprising a mechanical speed governor for an upper speed range and a hydraulic speed governor for a lower speed range, a supply line system containing a liquid therein, means for controlling said hydraulic speed governor by the pressure of said liquid, said pressure being dependent on the speed of the engine, a housing for each of said injection pump, said fuel feeding pump and said control mechanism, an injection pump shaft, a governor shaft, means for fastening together said control mechanism housing and said injection pump housing with said two shafts in coaxial relation and with one shaft inserted into the other, said housings forming a common housing aggregate, said governor shaft having cam means for driving said fuel feeding pump.

8. Control mechanism according to claim 1 wherein said first control device includes a first control spring and means to control the initial stress of said first control spring, and wherein said second control device includes a second control spring having a constant spring force.

9. Control mechanism for a combustion engine, comprising a mechanical governor for an upper speed range of the engine, a hydraulic governor for a lower speed range of the engine, a fuel quantity control member for controlling the quantity of fuel fed to the engine, means for conducting the fuel to the engine, a transmission lever between said mechanical governor and said fuel quantity control member, a control spring operative on said lever for controlling the upper control range thereof, a control spring operative on said lever for controlling the lower control range thereof, means for adjusting the spring tension of said first-mentioned control spring, and means for operating said hydraulic governor by the fuel pressure in said conducting means and for connecting said hydraulic governor to said fuel quantity control member.

10. Control mechanism according to claim 1 wherein said second control device includes a control spring operative on said connecting means for reducing the quantity of fuel for the lower speed range, and hydraulic damping means for damping the spring movement of said spring.

11. Control mechanism for a combustion engine, comprising a fuel quantity control member for controlling the quantity of fuel fed to the engine, a first governor for a lower speed range, a second governor for an upper speed range, means for adjusting said quantity control member by said speed governors, a first control spring acting on said adjusting means for reducing the quantity of fuel for the lower speed range, a second control spring acting on said adjusting means for reducing the quantity of fuel for the upper speed range, a stop for limiting the position of the quantity control member at idling load, a second stop for limiting the position of said quantity control member at full load, means to adjust the first named stop, and means to adjust the second named stop.

12. Control mechanism for an internal combustion engine comprising a member for regulating the quantity of fuel for the engine, a control device influenced by the speed of rotation of the engine, means by which the control device acts on the quantity control member, a stop member on said means, a stop for limiting a full load position of the control device and cooperating with said stop member, a lever on which said stop is arranged, and a second lever rotatable about a stationary shaft, said first-mentioned lever being swingably arranged around a fulcrum on said second lever, and means for changing the angular setting of said second lever around its axis of rotation in order to adjust the full load position, which is to be limited, by changing the position of said stop with respect to said stop member.

13. Control mechanism according to claim 12, including elastic means between said means for changing the angular setting of said second lever and the second lever, adapted to effect a yielding of the stop when said stop member meets said stop.

14. Control mechanism according to claim 12, including elastic means between said two levers for rotating said first-named lever around the axis of rotation thereof against said stop member.

15. Control mechanism according to claim 12, including means for rotating said first-named lever around the axis of rotation thereof to move the stop affixed thereto out of the range of said stop member.

16. Control device according to claim 12, including a third lever having a stop and rotatable about a relatively stationary axis of rotation for rotating said first-named lever around the axis of rotation thereof to move the stop affixed to the latter out of the range of said stop member.

17. Control mechanism according to claim 12, including a control spring acting upon the control device, a third lever having a stop and being rotatable around a stationary axis, said stop adapted when said third lever is turning in one direction to rotate said last-named lever round its axis of rotation in such a way that the stop arranged at said first lever is removed for providing an overload position, a further stop arranged at said third lever, adapted, when said third lever is turning in the other direction, to adjust the stop member against the force of the control spring, thereby increasing the distance between said stop member and the stop arranged at said first-named lever.

18. Control device for an internal combustion engine comprising a first speed regulating device for a lower speed range and a second speed regulating device for an upper speed range, means for controlling the quantity of fuel fed to the engine, an intermediate lever between each of said speed regulating devices and said control means, a shaft pivotally supporting one of said intermediate levers, a spring coaxially mounted with said shaft and in direct operative engagement with said one intermediate lever to rotate said one intermediate lever around said shaft in opposition to the movement by said second speed regulating device, means for varying the tension of said spring, and adjustable stops for limiting the adjusting movement of said varying means.

19. Control mechanism for a combustion engine, comprising a fuel quantity control member, a governor for a lower speed range, a governor for an upper speed range, means including a stop member for adjusting said quantity control member by said speed governors, a control spring acting on said adjusting means for the upper speed range, a control spring acting on said adjusting means for the lower speed range, said control springs being operative on said adjusting means for reducing the quantity of fuel fed to the engine, a stop for limiting the position of said quantity control member at full load, and yielding means to provide yielding movement of said stop during contact thereof with said stop member.

References Cited in the file of this patent

UNITED STATES PATENTS

| | | |
|---|---|---|
| 2,081,188 | Walker et al. | May 25, 1937 |
| 2,096,023 | Schnurle et al. | Oct. 19, 1937 |
| 2,177,120 | Schaeren | Oct. 24, 1939 |
| 2,229,804 | Gordon et al. | Jan. 28, 1941 |
| 2,372,179 | Edwards | Mar. 27, 1945 |
| 2,569,664 | Gewinner | Oct. 2, 1951 |

FOREIGN PATENTS

| | | |
|---|---|---|
| 500,365 | Great Britain | Feb. 8, 1939 |